United States Patent
Harnischfeger et al.

(10) Patent No.: US 7,306,071 B2
(45) Date of Patent: Dec. 11, 2007

(54) HYDRAULIC STEERING APPARATUS

(75) Inventors: Edwin Harnischfeger, Jossgrund (DE); Erhard Bergmann, Mirow (DE); Walter Scandella, Bergamo (IT); Vincenzo Domenico Bollero, Rivarolo Canavese (IT)

(73) Assignee: Bosch Rexroth AG, Stuttgart (DE)

( * ) Notice: Subject to any disclaimer, the term of this patent is extended or adjusted under 35 U.S.C. 154(b) by 110 days.

(21) Appl. No.: 10/512,541

(22) PCT Filed: Mar. 13, 2003

(86) PCT No.: PCT/DE03/00824

§ 371 (c)(1),
(2), (4) Date: Jan. 19, 2005

(87) PCT Pub. No.: WO03/091082

PCT Pub. Date: Nov. 6, 2003

(65) Prior Publication Data

US 2005/0161278 A1    Jul. 28, 2005

(30) Foreign Application Priority Data

Apr. 25, 2002 (DE) ............... 102 18 639
Aug. 8, 2002 (DE) ............... 102 36 557
Feb. 25, 2003 (DE) ............... 103 07 943

(51) Int. Cl.
*B62D 5/06* (2006.01)

(52) U.S. Cl. ............... 180/441; 180/442

(58) Field of Classification Search ............. 180/417, 180/421, 422, 441, 442
See application file for complete search history.

(56) References Cited

U.S. PATENT DOCUMENTS

| 3,394,545 | A | | 7/1968 | Thompson et al. |
|---|---|---|---|---|
| 3,566,749 | A | | 3/1971 | Allen et al. |
| 3,627,454 | A | * | 12/1971 | Goff et al. ............ 418/61.3 |
| 3,800,535 | A | * | 4/1974 | Ward et al. ............ 60/427 |
| 3,853,435 | A | * | 12/1974 | Ogasahara et al. ....... 418/61.3 |
| 4,534,577 | A | * | 8/1985 | Howard ............ 180/400 |
| 4,759,182 | A | * | 7/1988 | Haarstad ............ 60/384 |
| 4,759,419 | A | * | 7/1988 | Nagae et al. ............ 180/422 |
| 4,914,913 | A | * | 4/1990 | St. Germain et al. ....... 60/384 |
| 5,184,691 | A | * | 2/1993 | Leutner ............ 180/417 |
| 5,293,952 | A | * | 3/1994 | Ledamoisel et al. ....... 180/422 |
| 5,553,683 | A | * | 9/1996 | Wenzel et al. ............ 180/417 |
| 5,893,428 | A | * | 4/1999 | Fasse et al. ............ 180/403 |

FOREIGN PATENT DOCUMENTS

DE    24 09 207        9/1975
DE    199 45 122 A 1   4/2001

* cited by examiner

*Primary Examiner*—Tony Winner
(74) *Attorney, Agent, or Firm*—Oliff & Berridge, PLC

(57) ABSTRACT

A hydraulic steering apparatus with steering amount amplification is provided, wherein a metering device for supplying pressure medium to steering cylinders is actuated in accordance with an amount of rotation of the steering wheel. With the aid of a control block it is possible to deliver an additional pressure medium volume to the steering cylinders, wherein control of the control block is effected through the intermediary of a control circuit containing an effective control pressure that is substantially lower than the load pressure for transmitting the steering moment at the steering cylinder. A spring assembly for the control block is also provided, wherein two springs are arranged in parallel, one of which only takes effect following a predetermined stroke of the control element.

22 Claims, 8 Drawing Sheets

HYDRAULIC STEERING APPARATUS

The invention relates to a hydraulic steering apparatus in accordance with the preamble of claim 1.

Such a steering apparatus as known, e.g., from U.S. Pat. No. 3,566,749, is utilized in hydraulic steering circuits of vehicles and mobile machinery involving high axle loads and comparatively low travelling speeds (<50 km/h).

In the known solution, pressure medium is supplied to steering cylinders, via a metering device operating according to the gerotor principle, in correspondence with a steering angle set by means of a steering wheel or a joystick. Pressure medium for steering amount amplification is supplied in parallel by a pump via a control block to the steering cylinders, with control of the control block being carried out as a function of the output pressure of the metering device; i.e., a control pressure roughly corresponding to the pressure present at the steering cylinders for applying the required steering moment acts in the control chambers of the control block.

It is a drawback in this solution that owing to these comparatively high pressures (<100 bar), the control chambers of the control block, which conventionally have the form of spring chambers, must be closed with high-pressure caps in order to avoid a leakage.

In contrast, the invention is based on the objective of avoiding a leakage in the range of the control chambers of a control block of a steering apparatus with minimum expenditure in terms of device technology.

This objective is attained through a hydraulic steering apparatus having the features of claim 1.

In accordance with the invention, the steering apparatus comprises control means whereby the control pressure for controlling a control block controlling the pressure medium supply to a steering cylinder may be lowered substantially below the pressure required for actuating steering cylinders of the steering system. As a result of this pressure reduction of the control pressure of the control block, it is possible to do away with the use of high-pressure caps, so that the hydraulic steering apparatus may be manufactured, at an identical functional safety, with substantially less costs than the above described, known solution.

Customarily the control block used in the steering apparatus employs a proportional valve determining direction and velocity of the pressure medium, and an associated pressure compensator whereby the pressure difference across the measuring orifice constituted by the proportional valve is kept constant independently of fluctuations of the load or pump pressures. In one variant of the invention, the control chanters effective in controlling the proportional valve are supplied by a control pump with pressure medium via one respective regulating valve each, wherein the regulating position of the regulating valve is set as a function of the pressure downstream from the metering device. The control pump delivers a substantially lower pressure than the pump supplying the steering cylinders, i.e., in accordance with the invention, a control circuit operated at a comparatively low pressure is utilized.

In a preferred development, the pressure difference for actuation of the regulating valve is tapped at a nozzle arranged in a work line between a work port of the metering device and the associated steering cylinder.

In an alternative variant, the above described control chambers are also subjected to control oil that is conducted in a control circuit at a lower pressure level than the main circuit supplying the steering cylinders. This control circuit is subjected to pressure medium by a control pump, with the control pressure difference for actuation of the control block being applied through the intermediary of control apportioning means arranged in parallel with the metering device.

In a particularly preferred variant, the metering device operates in accordance with the gerotor principle, wherein the control apportioning means is formed by a conveying organ positioned on a shaft of the metering device.

In order to adjust various operating characteristics of the steering apparatus, the output pressure supplied by the control pump may be variable, e.g. by means of a variable pressure limiting valve.

As an alternative, the operational characteristics may be set by varying the spring bias of the pressure compensator of the control block. In a preferred solution, this bias of the pressure compensator may be modified through nozzles arranged in parallel, wherein a nozzle having a particular cross-section takes effect in accordance with a desired bias, and the bias is set as a function of the pressure drop across the respective active nozzle.

The continuously variable directional control valve of the LS control block of the steering apparatus is generally realized with a positive overlap, so that in order to pass through this overlap, a certain minimum stroke of the control element is necessary that is biased into its zero position with the aid of a spring assembly. The spring rate of the spring assembly should be selected as flat as possible, so that the required pressure range for passing through the overlap should be as small as possible. On the other hand, the spring rate of the spring assembly should be selected such that a maximum possible pressure range for fully opening the directional control valve may be covered, and the steering system may to a sufficient degree be supplied with pressure medium even in the event of rapid steering movements.

This trade-off between a low spring rate for passing through the overlap on the one hand, and a high spring rate in order to create a large pressure range on the other hand—can not be satisfied by a conventional spring assembly. In accordance with the invention, it is proposed in a preferred variant to design the spring assembly in each effective direction with at least two different springs, one of which only takes effect following a predetermined stroke of the valve element. This provides the advantage that, a spring having a comparatively low spring rate is effective while passing through the overlap, whereas a steeper spring characteristic is set during opening the connection between the pressure port and one of the work ports, by arranging at least two springs in parallel. As a result of the intervention of the second spring, the total spring rate is increased, and thus the relative stroke of the valve element in smaller in accordance with a control pressure difference than in a case when only one spring is acting.

In an advantageous development of the invention, the first spring of the spring assembly, which is effective from the start, is received with a bias that is lower than in the known solutions described at the outset.

The spring rate of the second spring is preferably designed with a lower spring rate than the first spring.

In a particularly compact embodiment, the second spring is guided coaxial with the first spring and is driven by a drive shoulder following a predetermined stroke of the control element.

In one embodiment of the invention, steering amount amplification may to a certain extent be adapted to existing operating conditions with the aid of a valve assembly. This valve assembly for modifying the steering amount amplification may include, e.g., a proportionally adjustable pressure limiting valve and two check valves each associated to one control side of the control block and acting opposite to each other. By mean of the pressure limiting valve, the maximum control pressure difference present at the control block—and thus the steering amount amplification—may be modified.

In a case where the control block is designed with a directional control valve spring-biased into a central position, it is possible to arrange upstream from it means which ensure even at low steering velocities that a predetermined minimum control pressure difference is applied to the directional control valve, and that the bias of the centering springs is overcome.

Further advantageous developments of the invention are subject matters of the further subclaims.

In the following, preferred embodiments of the invention shall be explained in more detail by referring to schematic drawings, wherein.

Figure 1:
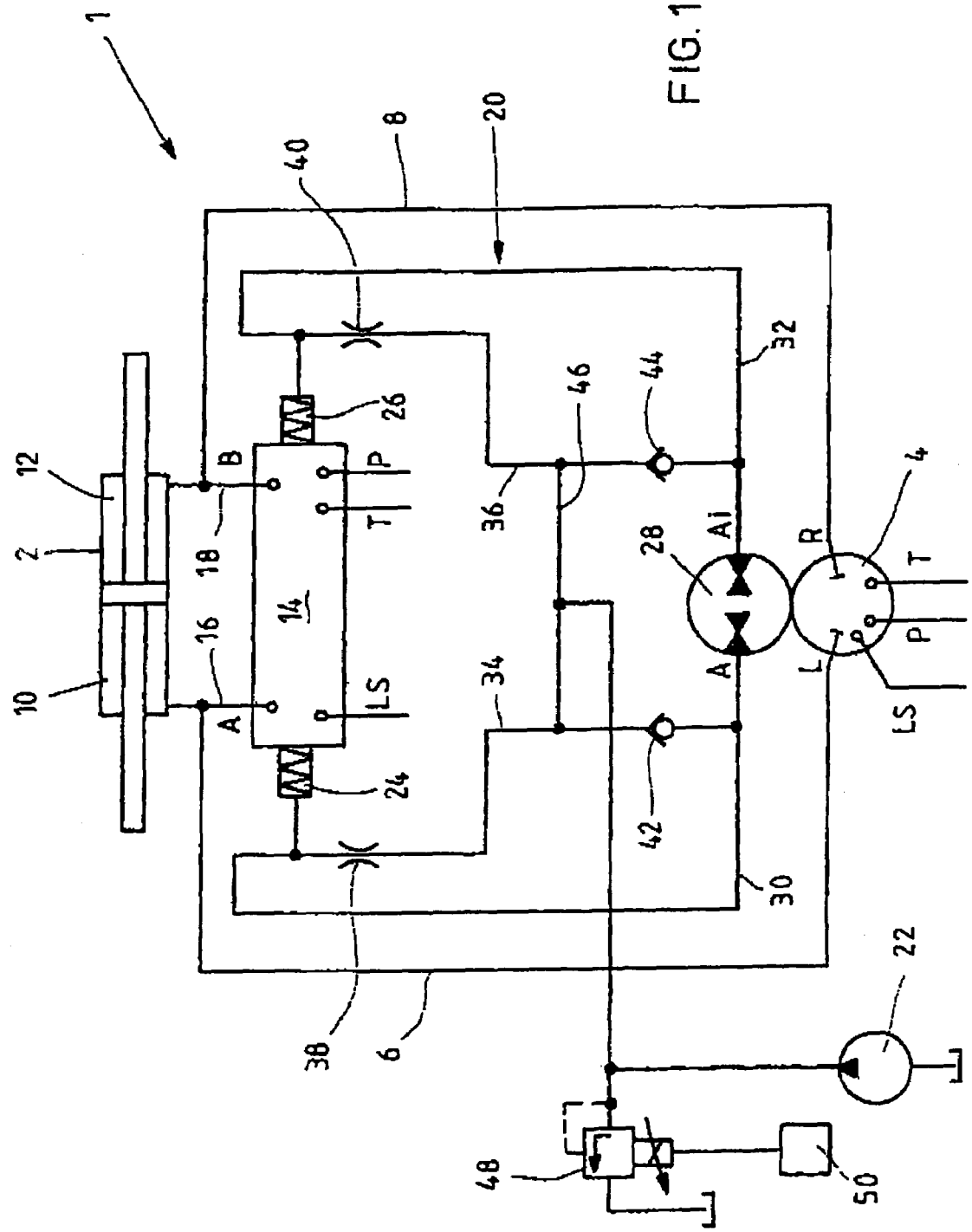
FIG. 1 shows a first embodiment of a hydraulic steering apparatus, wherein a control block may be subjected to a control pressure difference through the intermediary of control apportioning means.

FIG. 1 shows a circuit diagram of a first embodiment of a steering apparatus 1. It includes a steering cylinder 2 executed as a synchronizing cylinder, whereby the steering moment necessary for turning the steered wheels is applied. The pressure medium supply of steering cylinder 2 takes place with the aid of a steering unit 4 fundamentally constructed of a metering pump and a manually operated servo valve in a rotary element design. Operation of the servo valve and of the metering pump is effected through the steering column that is connected with a steering wheel of the vehicle. As the steering unit 4 is a standard component, reference is made to the related prior art, e.g., DE 199 28 530 A1 with regard to details of construction. The steering unit 4 has a pressure port P connected to a steering pump which is not represented in FIG. 1. This pressure port P is blocked when the steering wheel is not being operated. Two outlet ports L, R of steering unit 4 are connected with the two cylinder chambers 10, 12 of steering cylinder 2 via work lines 6, 8. When the steering wheel is rotated, e.g. to the left, pressure medium is supplied into the cylinder chamber 10 via port L and work line 6, while the pressure medium is conducted from cylinder chamber 12 via work line 8 and port R back to steering unit 4. Steering unit 4 moreover included an LS port, through the intermediary of which a load signal for controlling a priority valve or a pump may be tapped. Particularly in the case of heavy-duty utility machinery, steering unit 4 frequently is designed such that it is not capable by itself of providing the quantity of pressure medium necessary for actuation of steering cylinder 2. In this case, an additional quantity of pressure medium is conducted via a LS-control block 14 to steering cylinders 2 for steering amount amplification, with a control of control block 14 being effected in correspondence with an actuation of steering unit 4. The pressure medium supply is designed such that it is possible to steer with three to five rotations of the steering wheel from stop to stop of the steering cylinder.

The control block 14 employed in the steering apparatus in accordance with FIG. 1 has a proportionally adjustable directional control valve, whereby the pressure medium velocity and direction of the pressure medium flow are predetermined. Adjustment of the pressure medium velocity is effected via a measuring orifice to which a pressure compensator of the control block is associated. Control block 14 may also be a standard component as described, e.g., in Bosch-Rexroth data sheet RD 64 282/10.99 or in DR 197 15 021 A1. The pressure changes at the hydraulic consumers of the hydraulic system or at the pump are compensated through the intermediary of the pressure compensator, so that the pressure medium flow rate to the consumer is maintained constant even at variegated loads. Activation of the pump is performed as a function of the load pressure. If the steering system and the remaining working hydraulics are supplied by a common pump, a priority valve is used in order to ensure that the steering unit is supplied with pressure medium in a preferred manner. One variant of control block 14 is explained by way of FIGS. 6, 7 and 8.

The control block 14 represented in FIG. 1 has a pressure port P connected to the steering pump (or the central pump for supplying the working hydraulics and the steering system), a tank port T, an LS port for tapping the load pressure at steering cylinder 2, as well as two consumer ports A, B. The latter are connected with respective cylinder chambers 10 and 12 via consumer lines 16, 18. Control of control block 14 or, more precisely, of the proportional valves determining direction and magnitude of the pressure medium flow, is effected through the intermediary of a control circuit 20 supplied with control oil via a feed pump 22. The control circuit 20 is connected to the two control or spring chambers 24, 26 of the proportional valve of control block 14, so that the displacement of a main element of the proportional valve takes place in accordance with the pressure difference present at control chambers 24, 26.

As was mentioned at the outset, steering unit 4 includes a metering pump operating in accordance with the gerotor principle. On the shaft of this gerotor a second set of gears is positioned, which forms control apportioning means 28 whereby control oil may be supplied towards one of control chambers 24, 26 in accordance with the rotary speed of the steering wheel.

Control lines 30, 32 leading to control chambers 24 and 26, respectively, are connected with the two ports A, Ai of control apportioning means 28. From these two control chambers 24, 26, respective return lines 34, 36 lead back to the respective associated ports A and Ai. In these return lines 34, 36 one nozzle 38 and 40 each as well as one check valve 42, 44 each opening towards the ports A, Ai are arranged. The oil supplied by feed pump 22 is fed in through a connecting line 46 connecting the two return lines 34, 36, so that both branches of control circuit 20, and thus control chambers 24, 26, are subjected to the pressure delivered by the feed pump when the steering wheel is not being actuated—the proportional valve of control block 14 remains in its spring-biased basic position.

When the steering wheel is rotated, the set of gears positioned on the shaft oft the gerotor of steering unit 4 is also actuated, so that control oil is displaced within control circuit 20 in accordance with the steering velocity and the number of rotations of the steering wheel. In other words, when the steering wheel is rotated to the left, for instance, control oil is supplied via port A of control apportioning means 28 into control line 30 and from there to control chamber 24. The control oil is then returned via return line 34, nozzle 38, connecting line 46, and check valve 44 in control line 32. Depending on the geometry of nozzle 38, a control pressure difference manifests in the two control chambers 24, 26, so that the main spool of proportional valve 14 is taken into a position corresponding to the rotational speed of the steering wheel—steering cylinder 2 is then additionally supplied with pressure medium by the feed pump (not represented) via pressure port P and, e.g., consumer port A and consumer line 16, so that the rotation of the steering wheel is very rapidly converted into the steering moment required for turning the wheels.

In the embodiment represented in FIG. 1, a variable pressure limiting valve 48 is associated to feed pump 22, whereby the pressure in control circuit 20 may be adjusted. Through suitable control of pressure limiting valve 48, various pressures in control circuit 20 may be selected, so that different steering velocities may be realized depending on the operating condition of the vehicle. By varying the pressure in control circuit 20, it is possible to change the control oil flow quantity conducted via control block 14 at a same rotation of the steering wheel, so that the steering characteristics may be adapted, e.g., to the travelling speed of the vehicle.

Figure 4:
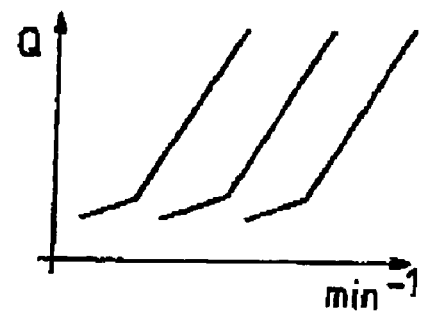
FIG. 4 shows flow characteristics of the control block of FIG. 2 at different biases of a pressure compensator of the control block.

Such characteristic lines are represented in FIG. 4, for example, where different quantities Q of supplied control oil may be set in accordance with the speed of an engine (e.g., Diesel engine) of the vehicle, with a possibility of pre-selecting the characteristic lines by modifying the maximum control pressure limited by pressure limiting valve 48.

An adjustment of pressure limiting valve 48 is carried out with the aid of a pressure sensor 50.

Feed pump 22 is designed such that the control pressure supplied by it is substantially lower than the steering pressure generated by steering unit 4, so that the pressure prevailing at control chambers 24, 26 is comparatively low, and thus sealing of the control chambers/spring chambers is substantially easier than in conventional solutions where it is necessary to use high-pressure caps due to the fact that a control pressure corresponding to the steering pressure (in excess of 100 bar) prevails in control chambers 24, 26. It was found that the variant in accordance with FIG. 1 may even be operated with control pressures in the range of 4 bar, so that feed pump 22 may have a very small design.

Figure 5:
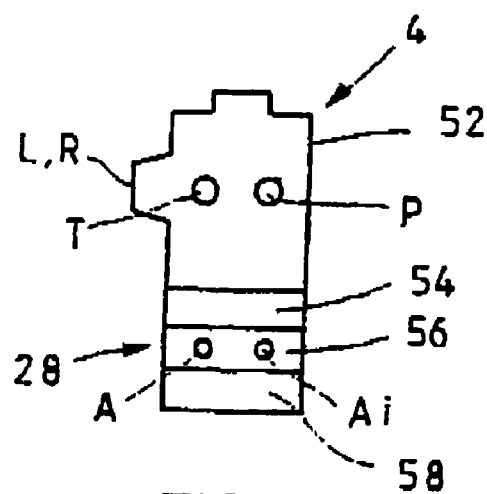
FIG. 5 shows lateral views of a metering device of the embodiment of FIG. 1.

As was already mentioned at the outset, steering unit 4 basically is a standard product, the housing 52 of which is schematically represented in FIG. 5. Inside this housing, the servo valve having the form of a rotary element and the set of gears—indicated under 54—of the associated gerotor (metering pump) are accommodated. In the embodiment in accordance with the invention, the second set of gears forming control apportioning means 28 is positioned on the prolonged shaft of the gerotor with the aid of an intermediate disc 56 in which ports A, Ai are furthermore formed. Onto this intermediate disc 56 a terminal plate 58 is then placed, so that steering unit 4 and control apportioning means 28 may be manufactured very simply and very compact by modifying a conventional steering unit.

Figure 2:
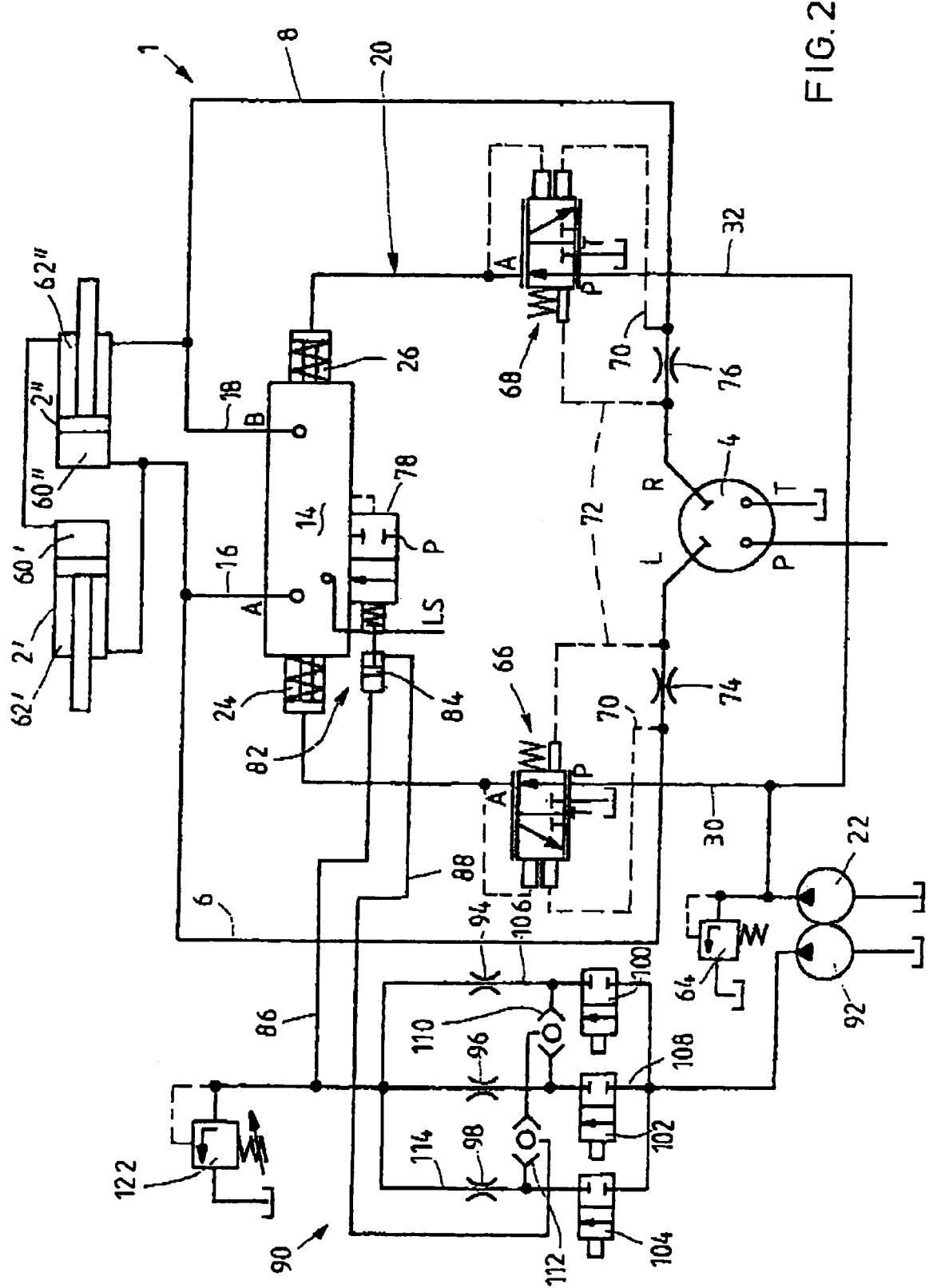
FIG. 2 shows an alternative embodiment wherein the control block may be subjected to a control pressure difference through regulating valves.

In FIG. 2 a variant of the concept according to the invention is represented.

In steering apparatus 1 in accordance with FIG. 2, ports L, R of steering unit 4—similarly to the above described embodiment—are connected via work lines 6, 8 with steering cylinders 2' and 2". In this variant not a single synchronizing cylinder 2 but two differential cylinders 2', 2" arranged in parallel are used. Work line 6 opens into a cylinder chamber 60" of steering cylinder 2" and into an annular chamber 62' of steering cylinder 2', while work line 8 opens into annular chamber 62" of steering cylinder 2" and into cylinder chamber 60' of steering cylinder 2'.

For the purpose of steering amount amplification an LS-control block 14 is again provided, whereby additional pressure medium may be supplied from a steering pump to steering cylinders 2', 2".

Control of the proportional valve (not represented) of control block 14 is effected via a dedicated control circuit 20 therein a control pressure substantially lower than the load pressure at the steering cylinders 2', 2" may be built up. In other words, in this variant, too, a comparatively low control pressure is adjusted via control circuit 20, so that sealing control chambers 24, 26 does not present any difficulties.

The control circuit has two control lines 30, 32 that are connected to the pressure port of control pump 22. The maximum pressure in control circuit 20 is limited by a control pressure limiting valve 64 to a maximum value, for instance 35 bar (the maximum steering pressure is higher than 100 bar).

In each control line 30, 32 a regulating valve 66 or 68 is arranged, whereby the control pressure in the respective associated control chamber may be regulated in accordance with the direction of control oil flow.

The two regulating valves 66, 68 are biased through the intermediary of one control spring each into a basic position wherein an inlet port P of the regulating valve is connected with a work port A. By shifting the valve elements of regulating valves 66, 68 from the represented basic positions, a connection with a tank port T is opened.

Control of the regulating valves 66, 68 is effected with the aid of two control lines 70, 72, so that the valve element is shifted into a regulating position in accordance with the pressure difference in control lines 70, 72.

In each of the two work lines 6, 8 a respective nozzle 74, 76 is arranged, with control line 72 opening into the section between nozzle 74 and the associated work port L, R, while control line 70 opens into a line section downstream from nozzles 74, 76. I.e., regulating valves 66, 68 are subjected to a control pressure difference corresponding to the pressure drop across nozzle 74 or 76, respectively.

In FIG. 2, the pressure compensator 78 associated with the proportional valve (not represented) of control block 14 is represented. As was mentioned before, the pressure drop across the measuring orifice formed by the proportional valve is maintained constant through the intermediary of this pressure compensator 78, independently of fluctuations of the pressure at steering cylinders 2 or at the steering pump. In the represented embodiment, the bias of a control spring 80 of pressure compensator 78 may be changed with the aid of bias means 82. The latter include a piston 84 adapted to be subjected to the pressure in a bias line 86 in the direction of "increase bias" and to the pressure in a further bias line 88 in the direction of "reduce bias." The pressure difference in the two bias lines 86, 88 is varied with the aid of bias valve means 90, so that various biases of control spring 80 of pressure compensator 78 may be set depending on the operating condition. In this way, it is basically possible to select the same characteristics as represented in FIG. 4, wherein the individual characteristic may be varied, e.g., in accordance with the gear selected for travel.

In the represented embodiment, bias valve means 90 are subjected to pressure-medium by pump 92. The bias valve means include three parallel biasing nozzles 94, 96, 98 each having a different nozzle diameter. It is being assumed that the effective diameter of nozzle 94 is the smallest, and the one of nozzle 98 is the largest.

Nozzles 94, 96, 98 are arranged in respective parallel branches having switching valves 100, 102, 104 arranged upstream thereof, so that when a switching valve is switched into its opened position, the respective associated nozzle in the control oil flow path is switched. A control line 106 containing nozzle 94 and switching valve 100, and a control line 108 containing nozzle 96 and switching valve 102 are connected between nozzle and switching valve with the inlets of a shuttle valve 110, the output of which in turn is connected to the inlet of another shuttle valve 112. The other inlet of this shuttle valve 112 is correspondingly connected with control line 114 that contains nozzle 98 and switching valve 104. Bias line 88 opens into the outlet of this shuttle valve 112.

The pressure in bias line 86 connected downstream from the nozzles is limited to an adjustable fixed value by means of a pressure limiting valve 122.

If, for instance, a comparatively low steering amount amplification is to be carried out in the first travelling gear (flat characteristic line in FIG. 4), then switching valve 100 is taken from its blocking position into its opened position, so that the control oil delivered by pump 92 flows via nozzle 94 to pressure limiting valve 122, with the pressure downstream from the nozzles and thus in the bias line 86 being kept at the predetermined value by pressure limiting valve 122. The pressure upstream from nozzle 94 is present at the inlet of shuttle valve 110 and is reported via the latter and via shuttle valve 112 into bias line 88. I.e., piston 84 is subjected to a pressure difference about corresponding to the pressure drop across the respective active nozzle 94, 96, 98. In the prevent case, nozzle 94 is designed with a comparatively small diameter, so that the pressure acting in the direction of relieving control spring 180 is comparatively high, and accordingly the bias of pressure compensator 78 and thus the pressure difference across the measuring orifice of the LS-control block is smaller than when the other nozzles 96, 98 are activated: the flatter characteristic line in the representation in accordance with FIG. 4 comes about. In order to set the other characteristic lines in accordance with FIG. 4, nozzle 96 or nozzle 98 is then opened. This change of bias may, of course, also be controlled through the intermediary of other suitable valve means.

In principle, establishing the variable steering velocity by changing the bias of pressure compensator 78 may also be employed in the concept visualized in FIG. 1 in order to realize different control characteristics.

Figure 3:
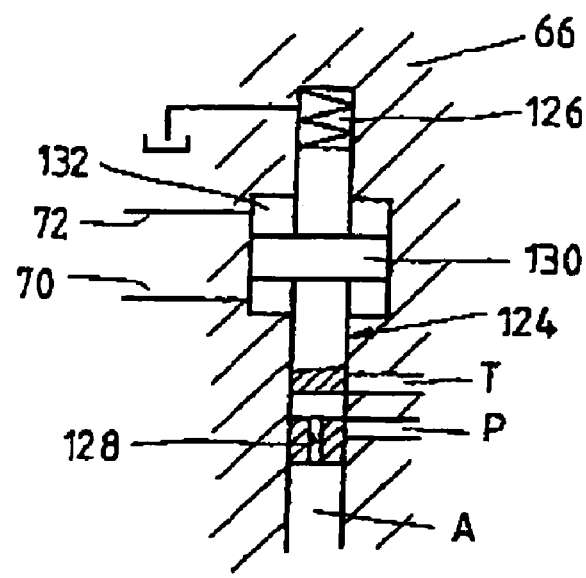
FIG. 3 is a sectional representation of a regulating valve of the embodiment of FIG. 2.

FIG. 3 shows a schematic sectional view of a regulating valve 66 that may be used in the circuit in accordance with FIG. 2. Regulating valve 66 has a valve element 124 biased by a spring 126 into a basic position (not represented), wherein pressure port P is connected with work port A via a connecting bore 128 of valve element 124.

Valve element 124 has, a radially protruding piston collar 130 guided in a radially broadened annular chamber. The chamber portion 132 which acts towards spring 126 and is represented in the upper part of FIG. 3, is subjected to the pressure upstream from the respective measuring orifice 74 (76) via control line 72, whereas the lower chamber portion 134 acting in the direction of "connection with the tank" is subjected to the pressure downstream from nozzles 74, 76 via control line 70.

In accordance with the force of spring 126 and with the pressure drop across nozzle 74, valve element 174 adjusts itself to a regulating position in which the connection from P to A and/or T is controlled open.

Figure 6:
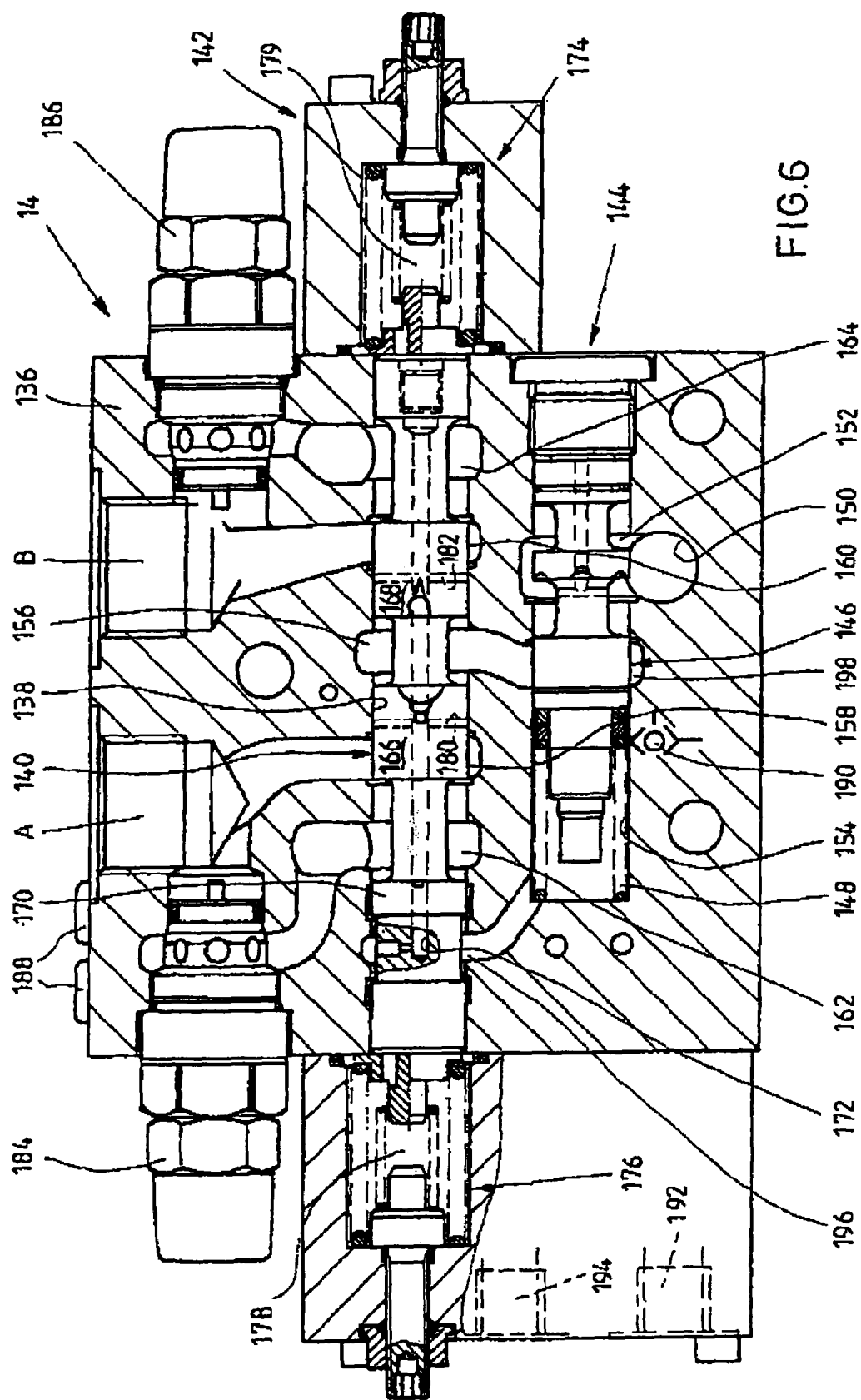
FIG. 6 is a sectional view of an LS-control block which may be used in a steering apparatus in accordance with FIG. 1 and—in a modified form—FIG. 2.

In accordance with this pressure difference, the pressure delivered by control pump 22 is thus reduced, with the aid of regulating valves 66, 68, to a control pressure whereby the valve element of the proportional valve of control block 14 is taken into its position that is dependent on the amount of rotation of the steering wheel. I.e., when the steering wheel is rotated, a pressure medium volume depending on the amount of rotation and velocity of the steering wheel is supplied via steering unit 4 to the respective steering cylinder 2', 2". In parallel, control block 14 is subjected to a control pressure in accordance with the pressure difference across the associated nozzle 74, 76 by regulating valve 66 or 68 and taken into an opened position in which an additional pressure medium volume is delivered by steering pump P to steering cylinders 2', 2", so that depending on the set steering characteristic (bias of pressure compensator 78), a steering moment corresponding to the amount of rotation and velocity of the steering wheel is built up, FIG. 6 shows a cross-sectional view of an LS-control block 14. Such an LS-control block has at least one valve disc or a valve housing 136 in which the two work ports A, B associated with a consumer, as well as the ports T, P (not represented), the LS port, and control ports are formed.

The valve housing 136 has a valve bore 138 wherein a control element 140 of the continuously variable directional control valve 142 is guided. Upstream from the latter a pressure compensator 144 is arranged, the regulating piston 146 of which is biased in the closing direction by means of a comparatively weak control spring 148. Regulating piston 146 is moreover acted on in the closing direction by the load pressure acting downstream from directional control valve 142 constituting a measuring orifice with a constant cross-section, and in the opening direction by the pressure acting at the inlet of pressure compensator 144 and about corresponding to the pressure at pump port P. This pressure port P is connected via a pressure passage 150 with a pressure compensator meter-in chamber 152 of a pressure compensator bore 154 accommodating the regulating piston 146. This pressure that is present in the pressure compensator meter-in chamber 152 acts via an internal bore of the regulating piston 146 on the right-hand end face of regulating piston 146 in the representation of FIG. 6.

The valve bore 138 is provided with several annual chambers which form a meter-in chamber 156, two meter-out chambers 158, 160, as well as two tank chambers 162, 164 connected with the tank port T.

The control element 140 is designed with a plurality of annular collars 166, 168 and 170, whereby the connections between the above mentioned chambers may be opened and closed. The control element 140 moreover includes an axial bore 172 closed at its end face and opening into the outer periphery of control collar 166 or 168 via two transverse bores 180, 182.

The control element is biased into its basic position by two spring assemblies 1174, 176. In this basic position, the two meter-out chambers 158 and 160 are connected with the adjacent tank chambers 162 and 164, respectively. The transverse bores 180 or 182 opening into the axial bore 172 are blocked. Moreover the connection from the meter-in chamber 156 to the adjacent meter-out chambers 160 and 158 is also closed.

In the valve housing 136 two secondary valves 184, 186 are moreover received, through the intermediary of which a connection from the meter-out chambers 158, 160 to the tank chambers 162 and 164, respectively, may be opened. This valve disc of the control block 14 moreover includes an LS-pressure limiting valve 188 as well as a shuttle valve 190, whereby the highest load pressure acting at several consumers may be tapped.

Control of the proportionally adjustable directional control valve 142 is effected through the intermediary of two schematically indicated pressure reducing valves 192, 194, through the intermediary of which a control pressure difference may be applied to spring chambers 178, 179 in spring assemblies 176 and 174, respectively, so that the control element 140 may correspondingly be displaced from its basic position, and a measuring orifice having a constant open cross-section is opened.

As is moreover visible in FIG. 6, the axial bore 172 is connected with the spring chamber of the control spring 148 via a control passage 196, so that the regulating piston is subjected to the pressure in the axial bore 172 in the closing direction.

When a control pressure difference is applied across the two pressure reducing valves 192, 194, the control element 140 is displaced against the force of one of the spring assemblies 174, 176. For example in the case of a displacement to the left (FIG. 6), this displacement takes place against the force of spring assembly 176.

The two control collars 166, 168 are designed such that the connection from meter-in chamber 156 to the adjacent meter-out chamber 158 or 160, respectively, is only opened following a predetermined stroke—i.e., in the basic position, the directional control valve is designed with a positive overlap.

After passing through this overlap, the connection between meter-in chamber 156 and meter-out chamber 158 is opened by the control collar 166. Concurrently the connection between tank chamber 162 and meter-out chamber 158 is closed, and the connection between the other tank chamber 164 and meter-out chamber 150 is opened, so that pressure medium may flow off via work port A to the cylinder chamber 10 of steering cylinder 2, and from the cylinder chamber 12 of the latter via work port B towards the tank T. As was already mentioned above, the pressure compensator is here subjected to the pressure at pressure port P in the opening direction (in a directions towards opening the connection of pressure compensator meter-in chamber 152 with a pressure compensator meter-out chamber 198 connected with meter-in chamber 156), whereas in the closing direction the force of control spring 48 and the pressure in meter-out chamber 158—or the highest load pressure in the case of several connected consumers—acts. The regulating piston 146 adjusts itself in accordance with these forces in a regulating position wherein the pressure drop across the opened measuring orifice (directional control valve 142) is maintained constant independent of load pressure at a constant measuring orifice opening.

In this regard, the construction principle represented in FIG. 6 does not differ from the control block as described in DE 197 15 021 A1, so that reference is made to this publication with regard to further details for the sake of convenience.

One problem in these known control blocks is that the directional control valve 142 is to already respond at very low control pressures, i.e., at correspondingly low rotary speeds of the gerotor of the steering unit 4, and thus allow for a suitable steering amount amplification. To this end it would be possible, for example, to design the spring assembly 174, 176 with a low spring bias and/or a low spring rate, so that the directional control valve 142 is opened even at low control pressure differences. In such a spring assembly having a low spring tension and/or a low spring rate, however, the directional control valve 142 would already open completely at a comparatively low control pressure difference, so that the available pressure range would be too small for a sufficient function of the steering apparatus. A spring having a higher spring rate so as to increase this pressure range may, however, not be used, for then the control pressure difference necessary for passing through the overlap would be much too high. In addition it is necessary, in order to ensure a secure zero position of the directional control valve 142, to set the bias of the spring assembly to a certain minimum value. This necessary bias would aggravate the above explained problems with use of a spring having a high spring rate.

Figure 7:
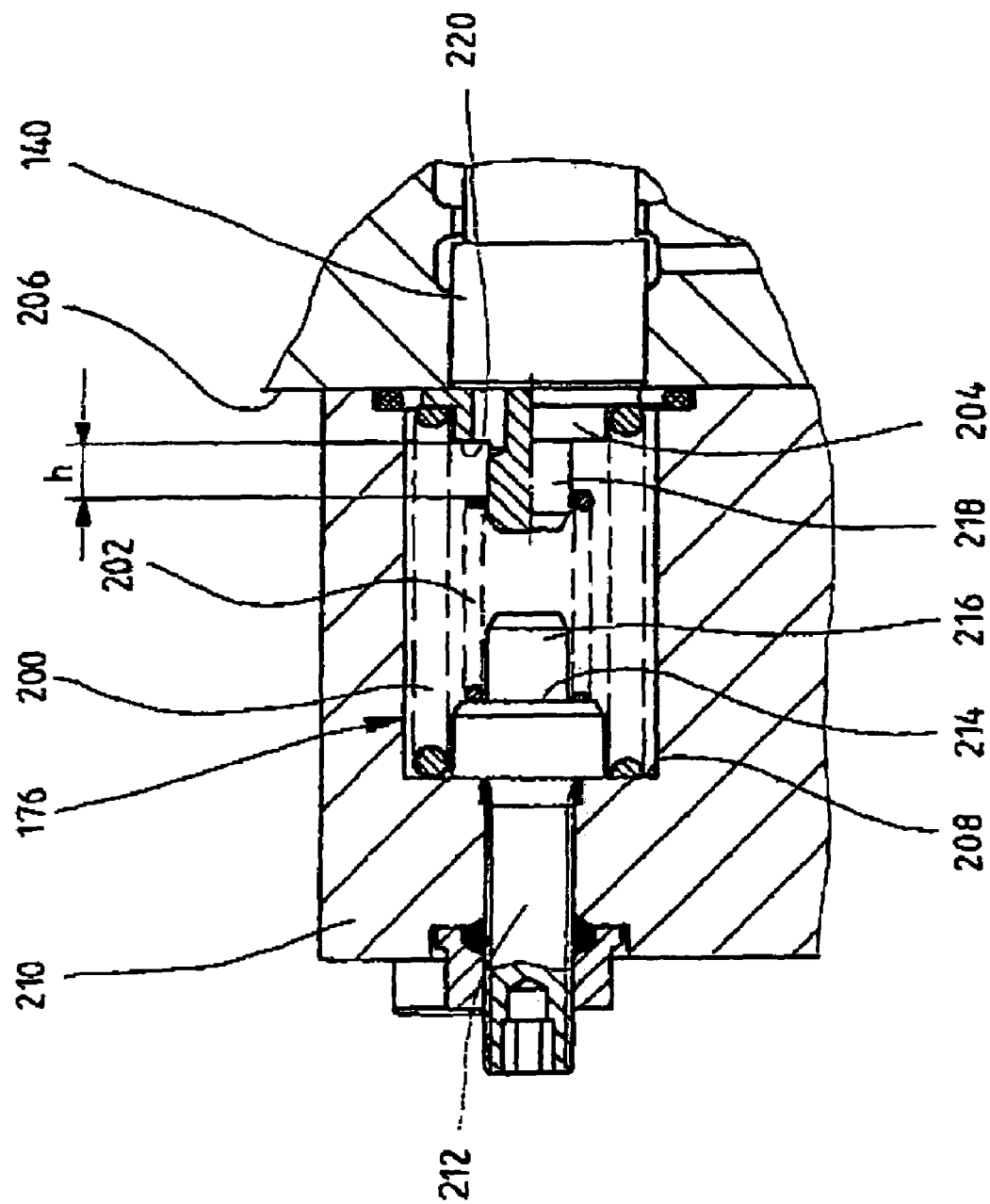
FIG. 7 is a detail view of the control block of FIG. 6.

In accordance with the invention, the embodiment represented in FIG. 6 uses a spring assembly 174, 176 as represented in detail in FIG. 7, with an exemplary description being given for the left-hand spring assembly 176. It includes two springs 200, 202 arranged in parallel. The first spring 200 is supported at an end face 206 of the valve housing 136 via a spring cup 204. The other end of the first spring 200 is supported on an inner shoulder 208 of an attached housing 210 and reaches around a bolt-type stroke—limitation 212 screwed into this housing 210. This first spring 200 is received with a predetermined bias between the spring cup 204 and the inner shoulder 208. During an axial displacement of the control element 140 to the left, the spring cup 204 is raised from the end face 206 after this bias is overcome, and accordingly the first spring 200 is compressed.

The second spring 202 is supported on a radial shoulder 214 of the stroke limitation 212 and extends beyond a radially reduced end portion 216 of the stroke limitation 212 as far as to an axial pin 218 of the spring cup 204. This axial pin 218 is encompassed by the end portion of the second spring 202, which end portion terminates at a predetermined axial distance h from a drive shoulder 220 of the spring cup 204.

Upon a further displacement of the control element 140 to the left (FIG. 7), this drive shoulder 220 contacts the adjacent end of the second spring 202, so that following this stroke h, displacement of the control element 140 takes place against the force of the first spring 200 which is received with a bias, and the force of spring 202. The above described stroke h is selected such that the second spring 202 only takes effect when the stroke overlap described at the outset has been passed through.

Figure 8:
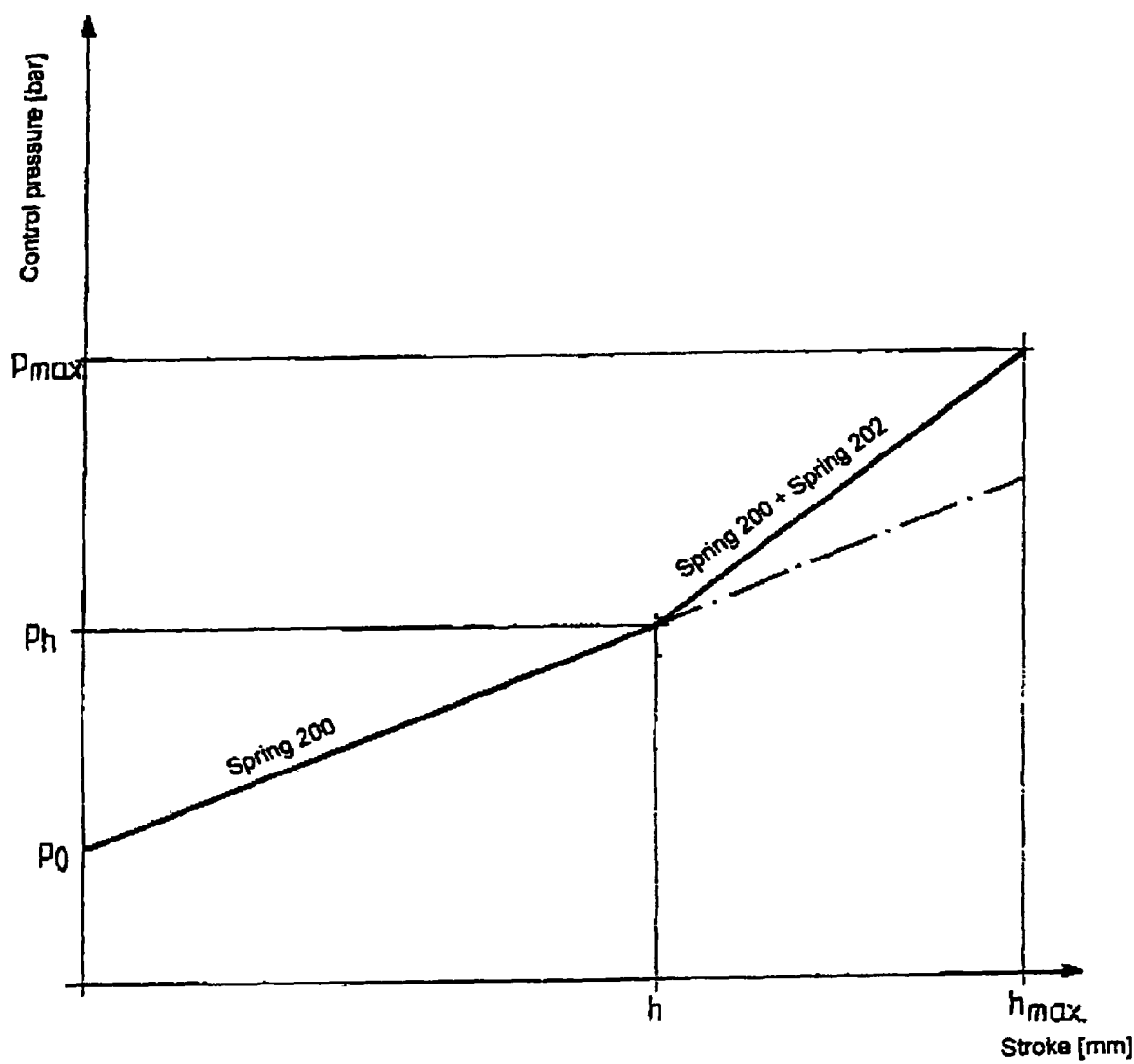
FIG. 8 shows spring characteristics of a spring assembly of the control block of FIG. 6.

The resulting spring characteristic is represented in FIG. 8. The control pressure acting on the directional control valve 142 is here represented over the stroke of the control element 140.

As was described above, the first spring 200 is received with a bias, so that a stroke of the control element 140 only takes place when the effective control pressure has reached a value $p_0$ corresponding to this bias. After exceeding this control pressure $p_0$ which may, e.g., be in the range from one to two bar in the case of a steering apparatus, the control element 140 is displaced in accordance with the control pressure in accordance with the approximately linear characteristic line of the first spring 200. Following the stroke h, the overlap of the directional control valve 142 is passed through, and the drive shoulder 220 contacts the second spring 202, so that starting from this stroke h both springs take effect. In accordance with the two spring rates of the springs 200, 202 a steeper characteristic line manifests, so that the maximum stroke $h_{max}$ is reached in the presence of a maximum control pressure $p_{max}$ that is substantially higher compared with a case in which only the spring 200 would have been effective (dash-dotted line in FIG. 8). Thanks to the parallel arrangement of the two springs 200, 202 it is thus possible to substantially expand the control range in comparison with a single spring having a lower spring rate, in which case only a comparatively low control pressure difference $p_h-P_0$ is required for passing through the overlap. As a result of this disposition in accordance with the invention, the control characteristic of the control block may optimally be adapted to the particular requirements existing in the case of a steering apparatus. Such a spring assembly may, of course, also be employed with directional control valve assemblies for other applications.

In the represented embodiment, the second spring 202 has a lower spring rate than the spring 200—in principle it would, however, also be possible to select the spring rate of the spring 202 to be greater than the one of the spring 200. For an optimization of the spring characteristic, it would also be possible for several springs to act instead.

In the case of the embodiment described in FIG. 1, a particular, preset pressure is maintained in lines 34, 36 through the intermediary of pressure limiting valve 48 arranged downstream from the nozzles 38, 40. A pressure manifesting in line 30 and 32, respectively, is such that a pressure difference in accordance with the metered amount prevails across the nozzle 38. When this set value is increased at the pressure limiting valve 48, the pressure in line 30 or 32, respectively, also rises accordingly. In other words, at a given metering amount, the pressure difference between lines 30 and 32 and thus the pressure difference present at control chambers 24 and 26 of the directional control valve 40 remains essentially constant irrespective of the setting of pressure limiting valve 48. It thus is not possible to change the steering amount amplification at a given metering amount by changing the limit pressure at pressure limiting valve 46.

Figure 9:
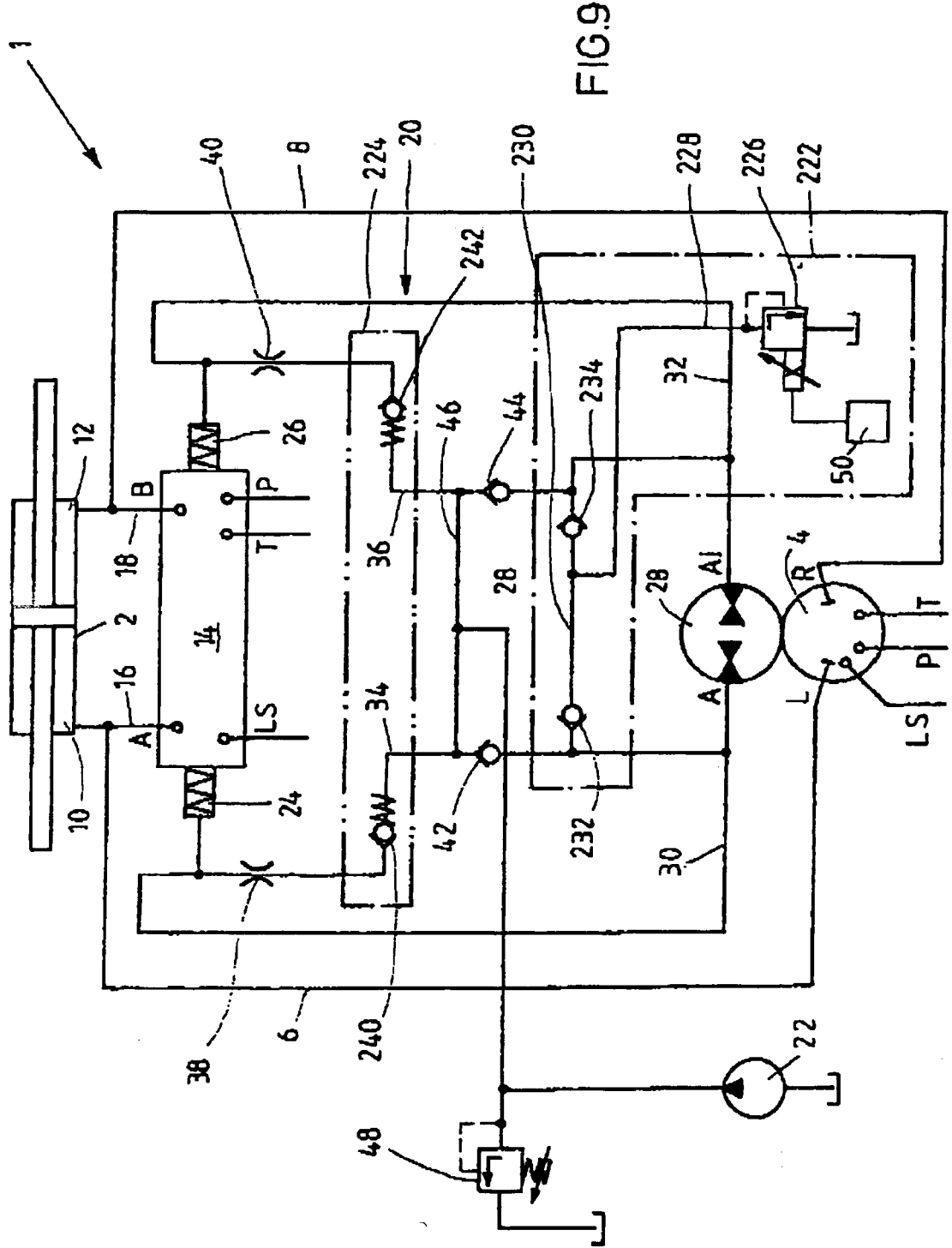
FIG. 9 is a circuit diagram of a third embodiment of a hydraulic steering apparatus.
Figure 10:
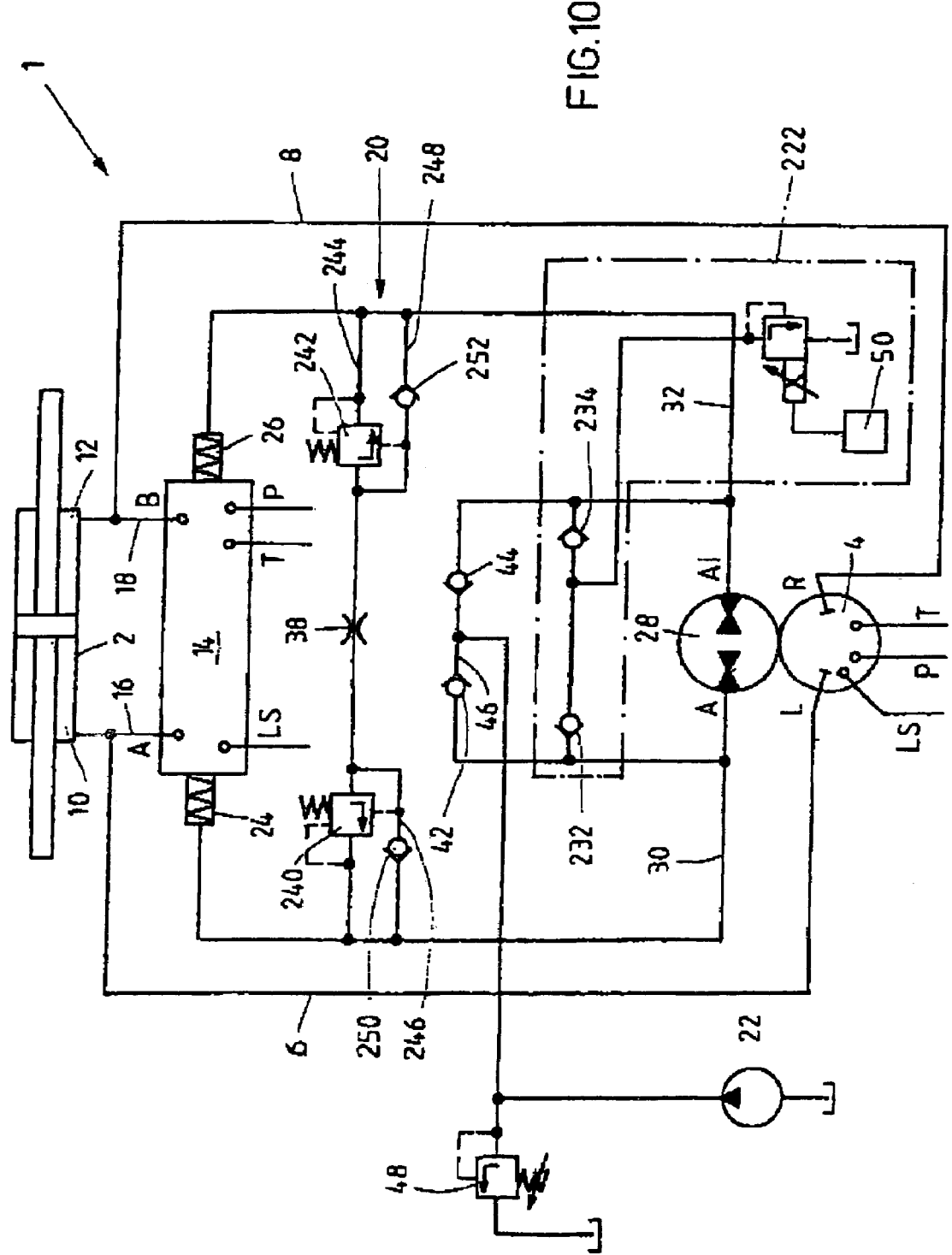
FIG. 10 is a circuit diagram of a fourth embodiment of a hydraulic steering apparatus.

In the embodiments represented in FIGS. 9 and 10, this steering amount amplification may be changed within certain limits at a given metering amount.

The embodiment represented in FIG. 9 corresponds to the variant represented in the basic concept of FIG. 1 while differing from this solution in a valve assembly 222 for changing the steering amount amplification and means 224 for improving the response characteristic at low steering velocities.

In accordance with FIG. 9, the valve assembly 222 for changing the steering amount amplification includes a proportionally adjustable pressure limiting valve—hereinafter referred to as amplification valve 226—which may be adjusted electromagnetically, e.g. in accordance with a signal of a sensor 50. The inlet of the amplification valve 226 is connected via a control passage 228 to a connection passage 230 running in parallel with connecting line 46.

In the connection passage 230 two check valves 232, 234 are provided which enable a control oil flow from line 30 or 32, respectively, towards the amplification passage 228 while blocking in the opposite direction. By means of the two oppositely acting check valves 232, 234 it is ensured that via the amplification valve 226 the pressure in the two lines 30 and 32 and thus in two control chambers 24 and 26 may be limited with the aid of only one pressure limiting valve. The two check valves 42, 44 are arranged upstream from check valves 232, 234 of valve assembly 222. By changing the limit pressure which may be set with the aid of amplification valve 226, the control pressure in control chambers 24, 26 may be limited to different values. Once this limit pressure is reached, the control element of directional control valve 142 of control block 14 cannot be displaced any more, and thus the steering amount flowing across the directional control valve cannot be increased further. With an increasing rotary speed of steering unit 4 and of control apportioning means 28, the steering velocity is then only raised due to the effect of the steering unit 4. In the embodiment represented in FIG. 9, pressure limiting valve 48 is, in contrast with the embodiment described by way of FIG. 1, not in the form of a proportionally adjustable valve, but of a simple valve capable of being adjusted to different values depending on the application, such as in the range of 1-2 bar, whereby it may be ensured that the lines will always be supplied with pressure medium.

The means 224 have no bearing on steering amount amplification per se, but serve for improving the response properties of control block 14. It is a problem with the above described control block 14, in particular the embodiment of a directional control valve 142 of control block 14 as represented in FIG. 6, that the control element 140 is acted on via a spring assembly 174, 176 in the direction of a center position. For a stable adjustment of this center position it is necessary for the spring assembly 174, 176 to be biased to a particular value. At a very low steering velocity, i.e., at a very slow rotation of control apportioning means 28, it may then happen that the pressure upstream from nozzle 38 or 40, respectively, is not high enough for overcoming the spring bias: this means that in this case the directional control valve 142 would not respond. This drawback is remedied with a valve assembly 224 in accordance with FIG. 9 or 10.

In the embodiment represented in FIG. 9, the means 224 include two pressure difference valves 240, 242 arranged downstream from nozzles 38 and 40, respectively, which have the form of check valves in the embodiment represented in FIG. 9. Such pressure difference valves 240, 242 generate between their inlets and outlets a substantially constant pressure difference. In the present case, the closing springs of check valves 240, 242 are set to a value equivalent to the bias of the spring assembly 174, 176, so that at a low speed of the metering device 28 the check valves 240, 242 cause the metering amount to be banked up to such an extent that the spring bias is overcome, and even at low steering velocities the control element 140 of directional control valve 142 is urged from the center position against the force of the spring assembly 174, 176: control block 14 then also reacts at low speeds of the metering devices.

The pressure difference valves 240, 242 may also be arranged upstream from nozzles 38 and 40, respectively, for the constant pressure drop across the pressure difference valve adds up to the pressure drop across the upstream or downstream nozzle valve independently of the position of the pressure difference valves.

In the embodiment represented in FIG. 10, a line pattern was selected which is somewhat different from the one in the practical example in accordance with FIG. 9. In accordance with FIG. 10, the two return lines 34, 36 are replaced with a center passage 244 extending between the two control lines 30, 32. In this center passage 244 a nozzle 38 is arranged which assumes the function of nozzles 38, 40 from the above described embodiments. On either side of nozzle 38 a respective pressure difference valve 240, 242 is arranged. These do, however, not have the form of check valves but of spool valves. In a pressure difference valve 240, 242 having the form of a spool valve, the dependency of the pressure difference on the flow quantity is less than with a check valve design. A like spool valve is described, e.g., in patent application DE 199 04 616 A1 to the same applicant. With regard to the function of such a spool valve, reference is therefore made to these explanations for the sake of convenience.

The two pressure difference valves 240, 242 may be bypassed through respective bypass passages 246, 248 each having arranged therein one check valve 250, 252 having an anti-parallel arrangement relative to pressure difference valve 240, 242. These check valves 250, 252 having an anti-parallel arrangement permit to use a single nozzle 38 instead of two nozzles as in the above described embodiments. The pressure difference valves 240, 242 are subjected to the pressures in bypass passage 246 and 248, respectively, in the opening direction, and to the force of a spring and to the respective pressure downstream in center passage 244 in the closing direction, so that a substantially constant pressure difference is generated between their inlets and their outlets.

In the embodiment represented in FIG. 10, the two check valves 42, 44 are provided in the connecting line 46. The valve assembly 222 for changing the steering amount amplification has the same structure as the embodiment represented in FIG. 9, so that further explanations may be omitted.

It is, of course, also possible in the embodiment in accordance with FIG. 10 to use a check valve instead of the spool valve as a pressure difference valve 240, 242. Correspondingly it would also be possible to use a spool valve in the variant represented in FIG. 9.

What is disclosed is a hydraulic steering apparatus with steering amount amplification, wherein a metering device for supplying pressure medium to steering cylinders is actuated in accordance with an amount of rotation of the steering wheel. With the aid of a control block it is possible to deliver an additional pressure medium volume to the steering cylinders, wherein control of the control block in accordance with the invention is effected through the intermediary of a control circuit containing an effective control pressure that is substantially lower than the load pressure for transmitting the steering moment at the steering cylinder.

There is moreover disclosed a spring assembly for the control block, wherein two springs are arranged in parallel, one of which only takes effect following a predetermined stroke of the control element. Hereby it is possible to adjust a characteristic line according to which the control element is biased into the zero position with a minimum bias, an optionally existing overlap may be passed through with a low control pressure difference, and the control pressure range for opening the control block is sufficiently large.

LIST OF REFERENCE SYMBOLS 1 steering apparatus
2 steering cylinder
4 steering unit
6 work line
8 work line
10 cylinder chamber
12 cylinder chamber
14 LS-control block
16 consumer line
18 consumer line
20 control circuit
22 feed pump
24 control chamber
26 control chamber
28 control apportioning means
30 control line
32 control line
34 return line
36 return line
38 nozzle
40 nozzle
42 check valve
44 check valve
46 connecting line
48 pressure limiting valve
50 sensor
52 housing
54 set of gears
56 intermediate disc
58 terminal plate
60 cylinder chamber
62 annular chamber
64 control pressure limiting valve
66 regulating valve
68 regulating valve
70 control line
72 control line
74 nozzle
76 nozzle
78 pressure compensator
80 control spring
82 bias means
84 piston
86 bias line
88 bias line
90 bias valve means
92 pump
94 biasing nozzles
96 biasing nozzles
98 biasing nozzles
100 switching valve
102 switching valve
104 switching valve
106 control line
108 control line
110 shuttle valve
112 shuttle valve
114 control line
122 pressure limiting valve
124 valve element
126 spring
128 connecting bore
130 annular collar
132 chamber portion
134 chamber portion
136 valve housing
138 valve bore
140 control element.
142 directional control valve
144 pressure compensator
146 regulating piston
148 control spring
150 pressure passage
152 pressure compensator meter-in chamber
154 pressure compensator bore
156 meter-in chamber
158 meter-out chamber 160 meter-out chamber
162 tank chamber
164 tank chamber
166 control collar
168 control collar
170 control collar
172 axial bore
174 spring assembly
176 spring assembly
178 spring chamber
179 spring chamber
180 transverse bore
182 transverse bore
184 secondary valve
186 secondary valve
188 LS-pressure limiting valve
190 shuttle valve
192 control port
194 control port
196 control passage
198 pressure compensator meter-out chamber
200 1st spring
204 2nd spring
204 spring cup
206 end face
208 inner shoulder
210 housing
212 stroke limitation
214 radial shoulder
216 end portion
218 axial pin
220 drive shoulder
222 valve assembly (variable amplification)
224 means (higher steering velocity)
226 amplification valve
228 amplification passage
230 connection passage
232 check valve
234 check valve
236 shut-off valve
238 shut-off valve
240 pressure difference valve
242 pressure difference valve
244 center passage
246 bypass passage
248 bypass passage
250 check valve
252 check valve

The invention claimed is:

1. Hydraulic steering apparatus, including a metering device adapted to be actuated in accordance with a steering velocity, for supplying at least one steering cylinder with pressure medium, and including a control block which has a directional control valve which is hydraulically operable by supplying a control pressure to a control chamber and via which pressure medium may additionally be supplied from a pump to at least one steering cylinder in accordance with an amount of rotation of a steering wheel, characterized by control means through which the control pressure supplied to the control chamber of said control block may be set to a pressure that is lower than the pressure acting downstream from said metering device.

2. The steering apparatus in accordance with claim 1, wherein said control means have a regulating valve whereby said control chamber may be supplied with pressure medium by a control pump, wherein said regulating valve is controlled in accordance with the pressure downstream from said metering device.

3. The steering apparatus in accordance with claim 2, wherein a nozzle is arranged inside a work line between steering cylinder and metering device, and control of said regulating valve is effected in accordance with a pressure drop across said nozzle.

4. The steering apparatus in accordance with claim 2, wherein said regulating valve has a pressure port, a work port, and a tank port, and in a spring-biased basic position said pressure port is connected with said work port.

5. The steering apparatus in accordance with claim 2, wherein said control block has two control chambers for controlling direction and velocity of the pressure medium flow, and to each control chamber one regulating valve is associated.

6. The steering apparatus in accordance with claim 1, wherein said control means include a second control apportioning means that are in operative connection with said metering device and may be supplied with pressure medium by a feed pump via a control circuit, and an outlet port of which is connected with said control chamber via a control line.

7. The steering apparatus in accordance with claim 6, wherein said control line is returned to the associated outlet port via a control nozzle and a check valve.

8. The steering apparatus in accordance with claim 7, wherein said control block has control chambers for adjusting direction and velocity of pressure medium flow, which control chambers are each connected to a respective outlet port of said control apportioning means, wherein return lines leading away from each control chamber are connected in the range between said nozzle and said check valve by means of a connecting line into which a pressure line of said feed pump merges.

9. The steering apparatus in accordance with claim 6, wherein said metering device includes a gerotor or similar devices, and said control apportioning means is formed by a conveying organ arranged on a shaft of said metering device.

10. The steering apparatus in accordance with claim 6, wherein the control pressure fed into said control circuit is variable.

11. The steering apparatus in accordance with claim 1, wherein said directional control valve is proportionally adjustable and is associated with a pressure compensator, and a bias acting in a direction of opening said pressure compensator is variable.

12. The steering apparatus in accordance with claim 11, wherein the bias may be varied hydraulically with the aid of bias valve means, whereby different bias pressures may be applied in accordance with a condition of travel.

13. The steering apparatus in accordance with claim 12, wherein said valve assembly includes one nozzle for each operating condition, wherein the bias is adjustable as a function of the pressure drop across the said respective nozzle.

14. The steering apparatus in accordance with claim 1, wherein said directional control valve is continuously variable and a control element of said directional control valve is biased by a spring assembly into a basic position, with two springs, a first and a second spring, being provided, and the second spring only taking effect following a predetermined stroke of said control element.

15. The steering apparatus in accordance with claim 14, wherein a first spring of said spring assembly is received within a prestressed state.

16. The steering apparatus in accordance with claim 14, wherein said second spring has a lower spring rate than said first spring.

17. The steering apparatus in accordance with claim 14, wherein said second spring is guided so as to be coaxial with said first spring and following said stroke may be driven by a drive shoulder of a spring cup supported on said control element.

18. The steering apparatus in accordance with claim 1, including a valve assembly for changing a steering amount amplification, whereby a control pressure difference present at said control block may be modified.

19. The steering apparatus in accordance with claim 18, wherein a control pressure present at said control block may be limited to a maximum value by said valve assembly.

20. The steering apparatus in accordance with claim 19, wherein said valve assembly has a proportionally adjustable pressure limiting valve and two check valves each associated to one control side of said control block.

21. The steering apparatus in accordance with claim 1, including means for improving response characteristics of said control block at a low steering velocity.

22. The steering apparatus in accordance with claim 21, wherein said means include two pressure difference valves associated with respective control sides of said control block.

* * * * *